April 21, 1964   W. S. COLLENS   3,129,835
FOOD PRESERVATION
Filed April 30, 1962

INVENTOR.
WILLIAM S. COLLENS
BY
ATTORNEY

United States Patent Office 3,129,835
Patented Apr. 21, 1964

3,129,835
FOOD PRESERVATION
William S. Collens, 123 8th Ave., Brooklyn, N.Y.
Filed Apr. 30, 1962, Ser. No. 191,211
4 Claims. (Cl. 215—56)

The present invention relates to food preservation and more particularly to protecting foods from bacterial deterioration especially those foods which are initially marketed under vacuum in a sealed container and which are not entirely consumed or used the first time the container is opened.

The packing of coffee and numerous items of food under vacuum is well-known and extensively employed. This technique, aside from its other advantages such as flavor retention, avoidance of loss of volatiles, etc., assists in the preservation of the food by reducing the oxygen concentration or amount so as to retard or inhibit the growth of many putrefactive bacteria. When a vacuum packed food is opened to remove some of the contents for use, the benefits of the partial vacuum are no longer available to the food remaining in the container. This is apt to result in spoilage or waste and presents a source of health hazard.

According to the present invention, means are provided for re-establishing the partial vacuum in the container by a relatively simple and effective modification of the container top or cover portion, thereby preserving the condition of the unused food remaining in the container, as well as maintaining flavor and taste.

Figure 1:
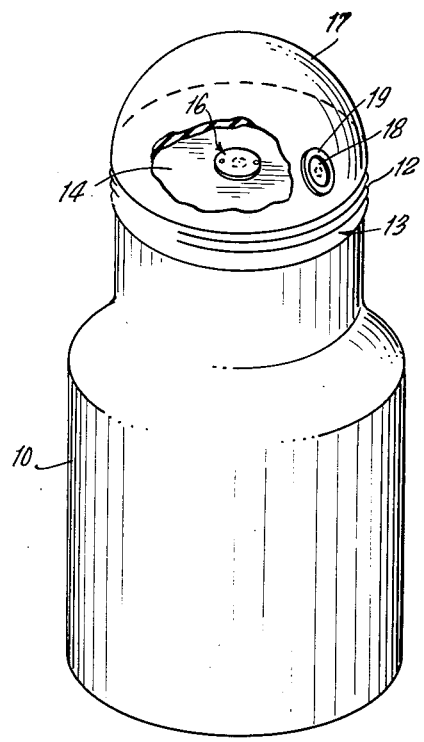
FIG. 1 is a perspective view of a container for powdered coffee or other food to which the invention has been applied, a portion being broken away to reveal the interior.
Figure 2:
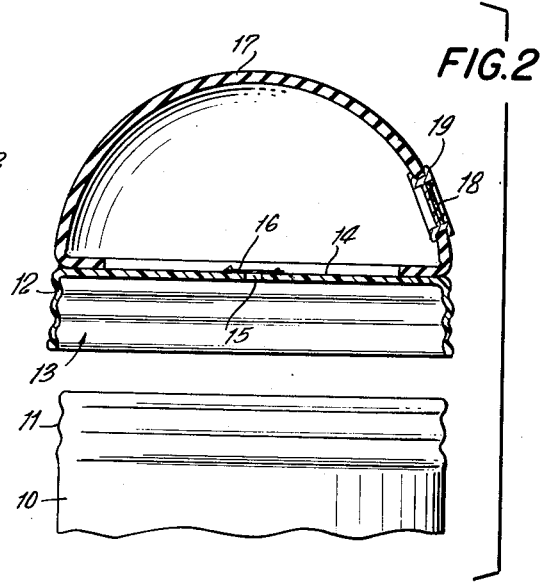
FIG. 2 is a sectional view through the container cover of FIG. 1 and shows, in elevation, the upper part of the container dissociated from the cover.

In the drawings, the container body 10, which may be of glass, metal, or any other desired material and which may be used for coffee, various foods, etc., has a threaded neck 11 for engagement with the threads 12 of cover, cap or lid 13 whose top closure portion 14, usually of metal, is provided with a central aperture 15 over which is mounted a one-way valve 16 which is a flutter valve, or optionally a ball valve, permitting egress of air out of the container but not into it when the cover is in place.

Adhesively or otherwise suitably secured on the upper surface of portion 14 is a hemi-spherical flexible member 17 or dome-shaped member of rubber or other suitable material and in one side thereof is a one-way valve 18 in a grommet or eyelet 19. Valve 18 may be either of the types mentioned above for 16 and is usually that form of valve used in atomizer or spray bulbs or syringes. Valve 18 permits air to leave member 17 but not to enter it.

Some containers of the type illustrated also have an air-impervious waxed or impregnated paper disc over the mouth thereof which is broken to remove food. The presence of such is immaterial to the present invention.

Figure 3:
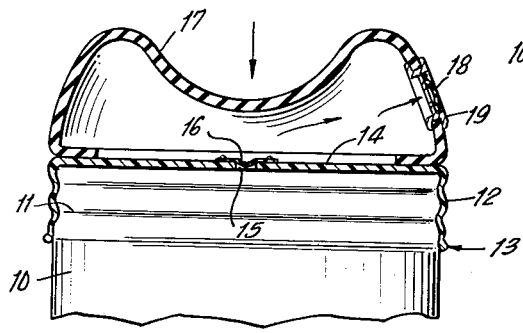
FIG. 3 shows the elements of FIG. 2 assembled but with the dome-shaped member partially collapsed.
Figure 4:
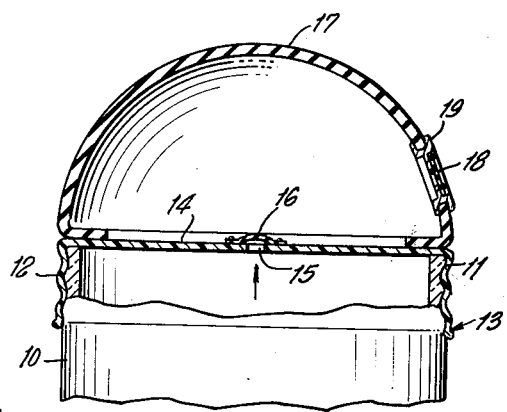
FIG. 4 is similar to FIG. 3 but with the dome-shaped member fully expanded.

Assuming a sealed container, the cover is unscrewed and some of the contents of the container removed. The partial vacuum pre-existing in the container is, of course, lost. The cover is then screwed back tightly in place and the dome-shaped member compressed and allowed to expand several times. On each compression (see FIG. 3) air is forced out valve 18 and upon each expansion air is sucked from the container into the interior of the dome-shaped member. The valves flex or "give" in the necessary direction so that increments of air are removed from the reclosed container until the partial vacuum is restored in the container and an anoxic (oxygen deficient) atmosphere re-created. The invention has been found to be simple, inexpensive and effective and the container cover with its attachments can also be used for other containers which it fits. A set of covers of different sizes and diameters is also a part of the invention as a separate unit.

It is further to be understood that the invention is not limited to use with the particular style of container illustrated and described since the principle is applicable to containers of other types and designs and can for example be applied to so-called "squeeze" bottles of deformable plastic in which event only one one-way valve is required as will be understood and such single valve is incorporated in the top or cap of the squeeze bottle so that when the bottle is laterally compressed air therein is expelled and cannot return.

What is claimed is:

1. A device for assisting in the preservation of food comprising a container body having a threaded neck and a removable cover therefor having threads engaging said neck, said cover having an aperture therethrough communicating with the interior of the container body, a one-way valve mounted over said aperture to permit air to pass only out of the container, a hemispherical elastic dome member secured on said cover and provided with a one-way valve permitting air to pass only out of said dome, whereby upon successive compressions and expansions of said dome a partial vacuum is created in said container.

2. A vacuum-creating cover for a container comprising a cover proper having a depending threaded annular flange adapted to engage a threaded container, said cover proper having an aperture therethrough, a one-way valve mounted over said aperture for admitting air upwardly out of said container and an elastic dome member secured on said cover proper and provided with a one-way air outlet valve in its wall.

3. A cover according to claim 2, in which the one-way valve over the aperture is a flutter valve.

4. A cover according to claim 2, in which both one-way valves are flutter valves.

References Cited in the file of this patent

UNITED STATES PATENTS

| | | |
|---|---|---|
| 1,336,367 | Martineau | Apr. 6, 1920 |
| 1,372,715 | Morledge | Mar. 29, 1921 |
| 2,105,957 | Severson | Jan. 18, 1938 |
| 2,506,362 | Hofmann | May 2, 1950 |
| 2,772,018 | Weiss | Nov. 27, 1956 |
| 2,890,810 | Rohling | June 16, 1959 |

FOREIGN PATENTS

| | | |
|---|---|---|
| 807,248 | Germany | Apr. 12, 1951 |